United States Patent
Kostiv et al.

(10) Patent No.: US 12,277,633 B2
(45) Date of Patent: Apr. 15, 2025

(54) CREATE EDITABLE VECTORIZED IMAGE FROM BITMAP IMAGE

(71) Applicant: Linearity GmbH, Berlin (DE)

(72) Inventors: Markiyan Kostiv, Lviv (UA); Sam Raven Oliver Eckert, Stuttgart (DE); Igor Filipe Viveiros de Assis, Berlin (DE); Ralph Theodori, Berlin (DE); Oleksandra Boiovych, Odesa (UA); Mihai Vladimir Danila, Hilden (DE)

(73) Assignee: LINEARITY GMBH, Berlin (DE)

( * ) Notice: Subject to any disclaimer, the term of this patent is extended or adjusted under 35 U.S.C. 154(b) by 91 days.

(21) Appl. No.: 17/986,157

(22) Filed: Nov. 14, 2022

(65) Prior Publication Data
US 2024/0161363 A1 May 16, 2024

(51) Int. Cl.
| | | |
|---|---|---|
| G06T 11/60 | (2006.01) | |
| G06T 3/40 | (2024.01) | |
| G06V 10/764 | (2022.01) | |
| G06V 10/774 | (2022.01) | |
| G06V 10/82 | (2022.01) | |

(52) U.S. Cl.
CPC ................ G06T 11/60 (2013.01); G06T 3/40 (2013.01); G06V 10/764 (2022.01); G06V 10/774 (2022.01); G06V 10/82 (2022.01); *G06T 2200/24* (2013.01); *G06T 2210/36* (2013.01)

(58) Field of Classification Search
CPC ....... G06T 11/60; G06T 3/40; G06T 2200/24; G06T 2210/36; G06V 10/82; G06V 10/774; G06V 10/764
See application file for complete search history.

(56) References Cited

U.S. PATENT DOCUMENTS

2006/0092475 A1* 5/2006 Kaburagi ............. H04N 1/4092
                                                                358/3.27
2019/0158112 A1* 5/2019 Gupta ....................... G06N 3/08

FOREIGN PATENT DOCUMENTS

CN        113344143 A  *  9/2021
CN        114722251 A  *  7/2022

OTHER PUBLICATIONS

Lei ("Use Focal Loss To Train Model Using Imbalanced Dataset", 2019, https://leimao.github.io/blog/Focal-Loss-Explained/) (Year: 2019).*
Li, Lei, Hongbo Fu, and Chiew-Lan Tai. "Fast sketch segmentation and labeling with deep learning." IEEE computer graphics and applications 39.2 (2018): 38-51. (Year: 2018).*
Lin, Tsung-Yi, et al. "Focal Loss for Dense Object Detection." 2017 IEEE International Conference on Computer Vision (ICCV), 2017, 10 pages.

(Continued)

*Primary Examiner* — Xin Sheng
(74) *Attorney, Agent, or Firm* — Womble Bond Dickinson (US) LLP

(57) ABSTRACT

An image is imported. The image is classified. A first algorithm from a plurality of algorithms, based on an image classification, is suggested via a graphical user interface (GUI). An input is received from a user, via the GUI, indicating that the user selects the suggested algorithm, or another algorithm, for vectorizing the image. The image is vectorized using the selected algorithm. An editable version of the vectorized image is presented to the user.

18 Claims, 4 Drawing Sheets

(56) References Cited

OTHER PUBLICATIONS

Lin, Tsung-Yi, et al. "Focal Loss for Dense Object Detection." 2017 IEEE International Conference on Computer Vision (ICCV), 2017, 14 pages.
Ahn, Namhyuk, et al. "Fast, Accurate, and Lightweight Super-Resolution with Cascading Residual Network." Computer Vision—ECCV 2018, 17 pages.
Zhang, Lvmin, et al. "Danbooregion: An Illustration Region Dataset." Computer Vision—ECCV 2020, 17 pages.
Selinger, Peter. "Potrace: A Polygon-Based Tracing Algorithm." Sep. 20, 2003, 16 pages.

* cited by examiner

CREATE EDITABLE VECTORIZED IMAGE FROM BITMAP IMAGE

TECHNICAL FIELD

Aspects of the present disclosure relate to computer systems, more particularly conversion of bitmap images to editable vector images.

BACKGROUND

Handwritten, manually created, and computer-generated art continues to play important roles in human communication. Much of this art is available in digital format. However, the digital format is often bitmaps, which can be difficult to edit.

SUMMARY

Methods and apparatuses for creating editable vectorized images from bitmap images are disclosed. In some embodiments, the methods comprise importing and classifying an image. The image can be classified, for example, as a sketch, a photograph, or an illustration. The method also includes suggesting an algorithm from a plurality of algorithms, based on an image classification via a graphical user interface (GUI). In some embodiments, the method includes receiving an input from a user, via the GUI, indicating that the user selects the suggested algorithm for vectorizing the image. An alternative algorithm can be selected. The method also includes vectorizing the image using the selected algorithm. An editable version of the vectorized image can be presented to the user.

DESCRIPTION OF DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
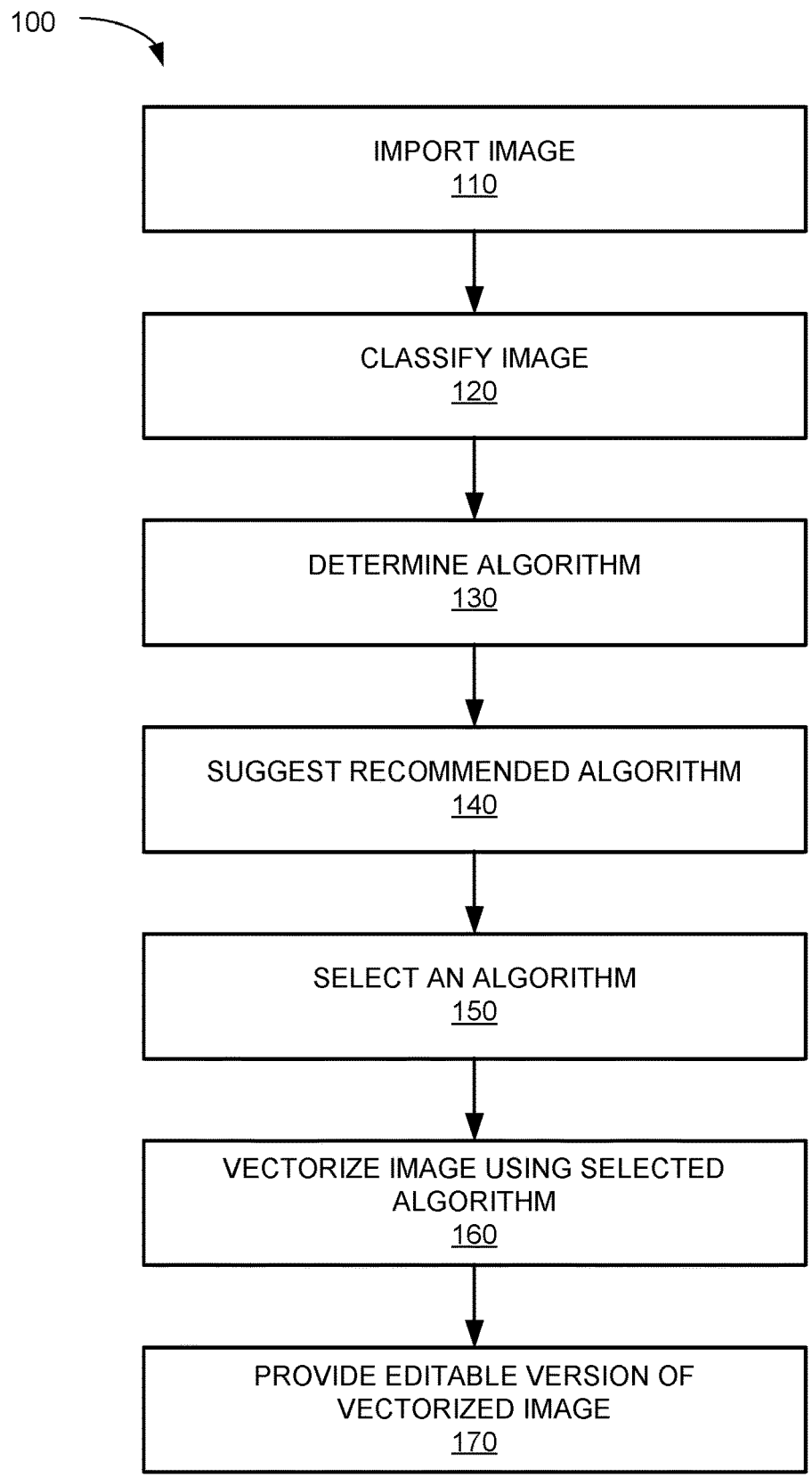
FIG. 1 is a flow diagram of a method for processing an image, in accordance with some embodiments of the present disclosure.

The present disclosure describes embodiments for importing an image; classifying the image based on a type of image; selecting an algorithm, from a plurality of algorithms, to vectorize the image; vectorizing the image using the selected algorithm; and providing an editable version of the vectorized image to a user.

Artificial Intelligence and Machine Learning (ML)-based image generation tools can provide impressive computer-generated images. However, because these images are not generated as vector images, editing an image generated by these tools can be difficult. Vectorization can improve an image's editability. Furthermore, different types of images may lend themselves to different algorithms for vectorization, and machine learning can be further applied to classify images such that they are vectorized using a particular algorithm. The present disclosure describes a mechanism for applying ML to classify the images according to an image type, vectorizing the images according to an algorithm associated with the image type, generating a vector image, and then customizing and editing the vectorized images.

Vector graphics can produce graphical representations including lines and their derivatives, including geometrical shapes such as circles, squares, stars, and polygons. Comprised of points (or coordinates) that are connected through lines and curves called paths, a line, curve, or shape can be enlarged/scaled without sacrificing its form and features. With vector graphics, one can zoom in and out of an image without losing detail. Additionally, vector objects can be exported without a loss of quality. Vector graphics contain a set of coordinates rather than more complex information, like the thousands, or even millions, of pixels in a digital photo. Consequently, the file size of a vector drawing can be very small, even for a complex drawing. Also, vector graphics can be easily manipulated. They can be moved, rotated, skewed, and inverted.

Generative deep learning models, or diffusion models, can enable users to create a variety of realistic images, in some cases, by using a descriptive natural language text (a so-called "prompt") or an image as an input. Diffusion models are generative models, meaning that they generate data similar to the data on which they are trained. Diffusion models work by destroying training data through a successive addition of Gaussian noise, and then learning to recover the data by reversing this noising process. After training, a diffusion model can generate data by passing randomly sampled noise through the learned de-noising process. Provided a prompt, the system can create new images that attempt to follow the prompt's description. When provided with an image as input, such models try to match details of that image and recreate them in different variations.

However, the images created by these systems can be pixel-based bitmap images. With bitmap images, it can be difficult to edit shapes, sizes, text, colors, elements, or other identifiable objects within them. To modify objects within those images, one must manually trace the shapes and modify them as desired.

In some embodiments, processing logic can obtain a bitmap image. In some cases, the processing logic can classify the bitmap image as a sketch, a photograph, or an illustration. In some embodiments, processing logic can apply an ML model to determine an appropriate algorithm for vectorizing the image based on the type of image. In some embodiments, the determination is based on whether the image is, for example, but not limited to, a sketch, a photograph, or an illustration. Processing logic can identify a preferred algorithm, depending on the classification. In some cases, processing logic can offer a choice of alternative algorithms to a user. In some embodiments, processing logic classifies the image using a convolutional neural network. In some embodiments, the neural network is based on a MobileNetV2 architecture that is trained using a dataset based on a focal loss function adapted for image classification. In some other embodiments, the neural network is based on a different architecture that is trained using another dataset. In some embodiments, a 224×224 bit image is used for image classification. The classification of images of other sizes is contemplated. In some embodiments, processing logic causes the model to output a probability of the image belonging to one of the three categories, and the category with the highest probability informs the suggested tracing algorithm.

In some embodiments, processing logic vectorizes a bitmap classified as a sketch using an algorithm that is based on Potrace. The processing logic transforms a bitmap into a vector outline by first decomposing the bitmap into paths, which form the boundaries between colors. In a second step, the processing logic creates optimal polygons that approximate each path. In a third step, the processing logic transforms each polygon into a smooth outline. In an optional fourth step, the processing logic joins consecutive Bezier curve segments together, where possible, to optimize the resulting curve. Finally, the processing logic generates an output in a desired format.

In some embodiments, processing logic vectorizes photographs with an algorithm that uses statistical region merging, grouping neighboring pixels based on the similarity of their shades within a particular threshold. In some cases, the algorithm for vectorizing photographs splits the colors from the image into a certain predefined number of buckets and merges them into regions. As the boundaries of these regions are identified, the processing logic establishes outlining paths, and constructs a vector representation of the original image.

In some embodiments, processing logic vectorizes illustrations with an algorithm that uses the DanbooRegion dataset to train a neural network that segments the bitmap into regions. In some embodiments, processing logic uses a dataset comprising user-contributed artwork. This dataset can enable users to upload and store their artwork. Other datasets are contemplated. The algorithm obtains a probability skeleton map from a super-resolution neural network. In some embodiments, the probability map is four times the size of the input, e.g., 512×512→2048×2048. In some other embodiments, the probability map can be larger or smaller. The algorithm can also threshold the probabilities to obtain binary markers. Thresholding is a technique for managing a tradeoff between false positives and false negatives. In some embodiments, the algorithm reduces noise ("cleans up" the image) with morphology operations. Morphology is an image processing technique based on two operations: erosion and dilation. Erosion enlarges objects in an image, while dilation shrinks objects in an image. Some embodiments examine the thresholded image to identify connected components. Some embodiments eliminate small markers based on a minimum size element threshold. Some embodiments use a watershed algorithm to segment, or separate, regions of the image. A watershed transformation treats an image upon which it operates like a topographic map, with the brightness of each point representing its height, and finds the lines that run along the tops of ridges. In some embodiments, processing logic can merge regions with similar colors and obtain final contours.

After an algorithm is selected, some embodiments vectorize the bitmap image, using the selected algorithm, to obtain vectorized shapes, elements, and objects. In some embodiments, a user can edit these shapes, elements, and objects as vectors, rather than as groups of pixels. The process of converting a bitmap into vector outlines can also be called tracing.

FIG. 1 is a flow diagram of one embodiment of a process that includes importing an image, classifying the image, determining and applying an algorithm to vectorize the image, and making the vector image editable, in accordance with some embodiments of the present disclosure. The process is performed by processing logic that may comprise hardware (circuitry, dedicated logic, etc.), software (such as is run on a general-purpose computer system or a dedicated machine), firmware or a combination of the three. In one embodiment, a tablet running a vector graphics application program executes the process. As shown in FIG. 1, process 100 illustrates example functions used by various embodiments. Although specific function blocks ("blocks") are disclosed in process 100, such blocks are examples. That is, examples are well suited to performing various other blocks or variations of the blocks recited in process 100. It is appreciated that the blocks in process 100 may be performed in an order different than presented, and that some of the blocks in process 100 may not be performed.

Referring to FIG. 1, process 100 begins at block 110, where processing logic imports an image into a vector graphics application module. In some embodiments, the image is in bitmap, or raster, format. Other image formats are contemplated. In some embodiments, a diffusion model creates the image using a descriptive natural language text, or prompt.

At processing block 120, processing logic classifies the image using a convolutional neural network. This neural network can involve a MobileNetV2 architecture trained using a dataset based on a focal loss function that has been adapted for image classification. In some embodiments, processing logic classifies the image as, for example, but not limited to, a sketch, photograph, or illustration, in order to identify a preferred algorithm. Other classifications are contemplated. In some embodiments, processing logic classifies the image using machine learning or other methods of artificial intelligence.

At processing block 130, processing logic determines an appropriate algorithm for vectorizing the image. In some cases, processing logic causes the model described in block 120 to output a probability of an image belonging to each of the three categories, and the category with the highest probability informs the suggested tracing algorithm. In some embodiments in which processing logic classifies the image as a sketch, processing logic may employ an algorithm based on Potrace. In some embodiments in which processing logic classifies the image as a photograph, processing logic may employ an algorithm using statistical region merging. In some embodiments, in which processing logic classifies the image as an illustration, processing logic may employ an algorithm using the DanbooRegion dataset. The use of other datasets is contemplated.

At processing block 140, processing logic suggests the determined algorithm to the user. In some cases, an ML model is used to determine an algorithm for vectorizing the bitmap based on whether the bitmap is, for example, but not limited to, a sketch, photograph, or illustration. A suggested algorithm is identified depending on the classification. In some cases, the processing logic offers a user a choice of alternative algorithms. In some embodiments, the processing logic performs image classification using a convolutional neural network. In some embodiments, the neural network is based on a MobileNetV2 architecture trained using a dataset based on a focal loss function that has been adapted for image classification. In some other embodiments, the neural network is based on a different architecture that is trained using another dataset. In some embodiments, the model outputs a probability of an image belonging to one of the three categories, and the category with the highest probability informs the suggested tracing algorithm.

At processing block 150, the processing logic selects an algorithm. In some embodiments, the user may employ the suggested algorithm or choose another available algorithm. For example, a user may not be satisfied with an initial result and wish to try an alternative algorithm. In another example, a user may have a different purpose than anticipated, e.g., tracing an illustration as a sketch to obtain a black and white result. Other algorithms are contemplated, e.g., an algorithm that works with line art to recognize strokes rather than shapes.

At processing block 160, processing logic vectorizes the image using the selected algorithm. If the image has been identified as a sketch, the bitmap can be converted into a vector outline by first decomposing the bitmap into paths that form the boundaries between colors. The processing logic can then approximate each path with an optimal polygon and transform each polygon into a smooth outline. Optionally, processing logic can optimize the resulting curve by joining together consecutive Bezier curve segments.

If the image is identified as a photograph, the processing logic can use statistical region merging to group neighboring pixels based on the similarity of their shades of colors within a particular threshold. In some cases, the processing logic for vectorizing photographs splits all colors from the image into a certain predefined number of buckets and merges them into regions. As the processing logic identifies the boundaries of these regions, it can establish the outlining paths and construct a vector representation of the original image.

If the processing logic identifies the image as an illustration, an algorithm using a neural network trained with an appropriate dataset, e.g., the DanbooRegion dataset or an internally-developed dataset, can segment the bitmap into regions by obtaining a probability skeleton map from a super-resolution neural network. In some embodiments, the probability map is four times the size of the input, e.g., 512×512→2048×2048. The processing logic can threshold the probabilities to obtain binary markers. The processing logic can eliminate small markers based on a minimum size element threshold. In some cases, the processing logic can segment, or separate, regions of the image using a watershed algorithm. The processing logic can merge regions with similar colors and obtain final contours.

At processing block 170, processing logic presents the vectorized image to the user for editing. At this point, the user may move or scale the individual elements of the image, adjust their curves, and adjust their colors (using different color schemes such as red-green-blue (RGB) and cyan-magenta-yellow-key (CMYK). Processing logic allows the user to save the edited image for subsequent editing.

Figure 2:
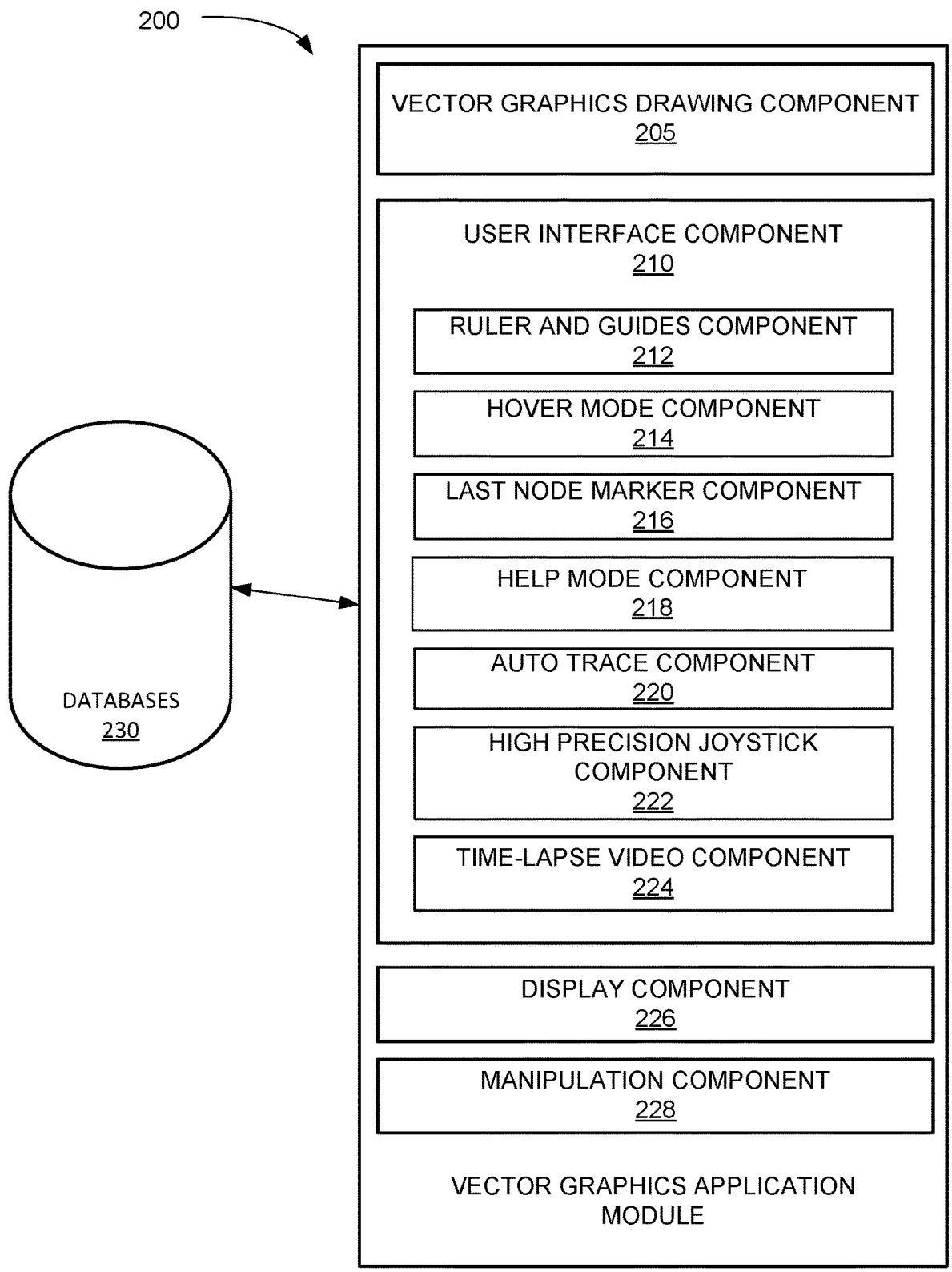
FIG. 2 is an example component diagram of an architecture for performing operations with a graphics application, in accordance with embodiments of the present disclosure.

FIG. 2 depicts an illustration of an example component diagram of an architecture for performing operations with a graphics application, such as a vector graphics application module 200 running on a tablet, e.g., iPad, or other computer system.

In some embodiments, the vector graphics application module 200 includes a vector graphics drawing component 205 to perform vector graphics for the vector graphics application module 200 using information from one or more databases 230 (or other memories).

In some embodiments, the vector graphics application module 200 includes a user interface component 210 for generating user interface elements through which a user accesses and uses features and functions of the vector graphics application module 200.

In some embodiments, the user interface component 210 includes a ruler and guide lines component 212 to control the use of rulers and guide lines for an artboard, a hover mode component 214 to control hover operations for vector graphics application module 200, a last node component 216 to identify a last node of a vector path as part of vector graphics operations for vector graphics application module 200, a help mode component 218 to provide help information to a user of vector graphics application module 200, an auto trace component 220 to enable a user to vectorize an image using vector graphics application module 200, a high precision joystick component 222 to move drawing elements displayed in a user interface by vector graphics application module 200, and a time-lapse video component 224 to generate a time-lapse video using vector graphics application module 200, a display component 226, a manipulation component 228 to allow a user to manipulate a touch surface display.

In some embodiments, the vector graphics application module 200 provides an auto trace component 220, accessed by a GUI element in the user interface component 210 that a user can select to cause the vector graphics application module 200 to convert a bitmap image to vectors. In some embodiments, the auto trace component may perform some of the functions of process 100 as shown in FIG. 1 above. In some embodiments, if the image is not a vectorized image, the vector graphics application automatically displays an auto trace button to provide the user an opportunity to convert the image to vectors.

In some embodiments, display component 226 includes a graphical display device. The graphical display device may be a touch surface display screen, a monitor, computer screen, projection device, or other hardware device for displaying graphical user interfaces containing images and other data from artwork. In some embodiments, display component 226 displays the GUI with the list of selectable user interface elements with which a user of the display component interacts.

In some embodiments, the vector graphics application module 200 stores and retrieves information from one or more databases 230.

Figure 3:
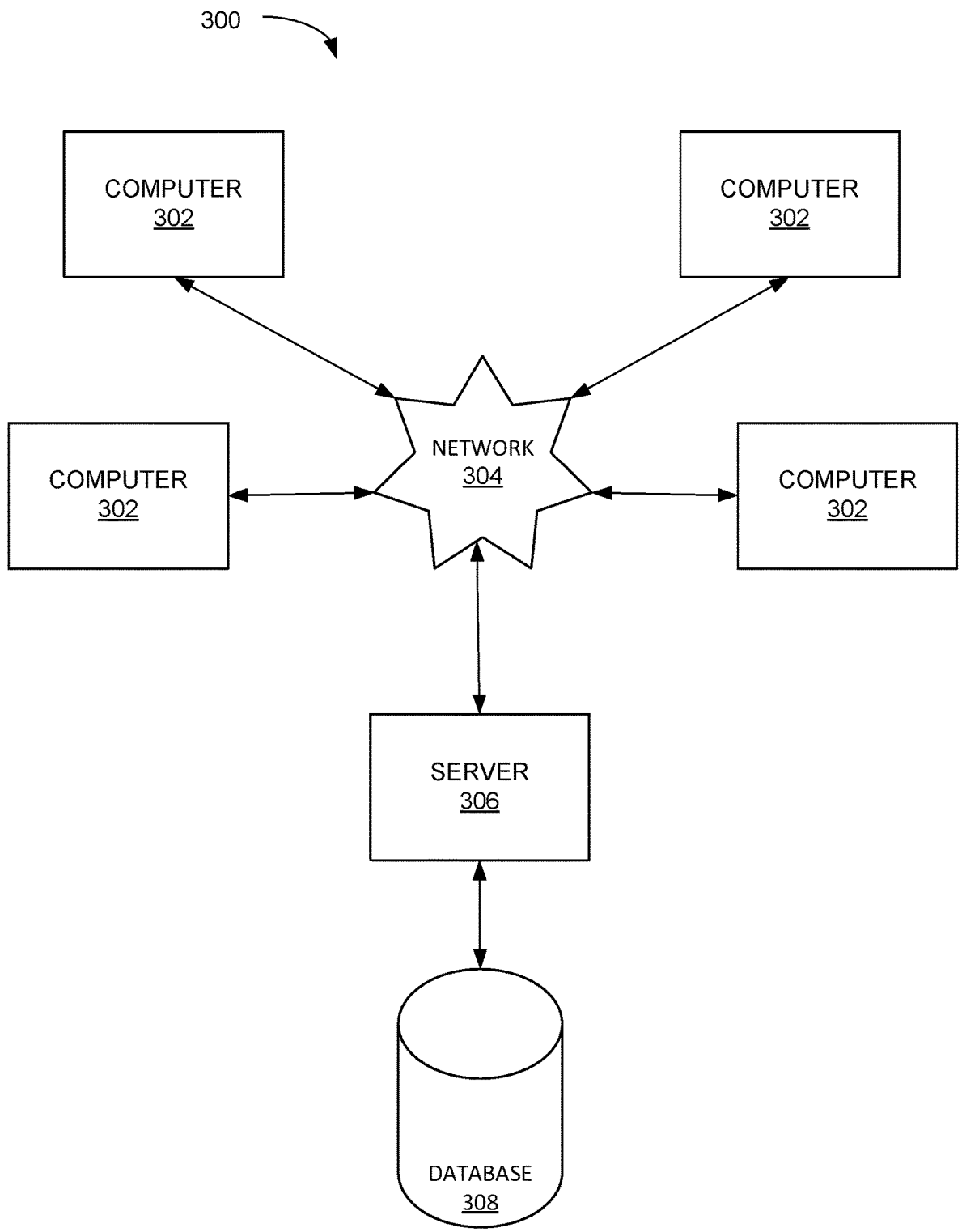
FIG. 3 is a component diagram of an example computing system environment, in accordance with embodiments of the present disclosure.

FIG. 3 illustrates a component diagram of an example computing system environment 300, in accordance with embodiments of this disclosure. It will be understood and appreciated by those of ordinary skill in the art that the example computing system environment 300 is merely an example of one suitable computing environment and is not intended to suggest any limitation as to the scope of use or functionality of the invention. Neither should the computing system environment 300 be interpreted as having any dependency or requirement relating to any single component or combination of components illustrated therein.

In some embodiments, the computing system environment 300 includes one or more tablet (or other) computer systems 302. Each tablet computer system 302 may be connected to a computer network 304 that include logical connections to a server 306. Exemplary computer networks 304 may include, without limitation, local area networks (LANs) and/or wide area networks (WANs). When utilized in a WAN networking environment, the server 306 may include WiFi or another means for establishing communications over the WAN, such as the Internet. In a networked environment, program modules or portions thereof may be stored in association with server 306, database 308, or any of computers 302. For example, and not by way of limitation, various application programs may reside in the memory associated with any one or more of computers 302. It will be appreciated by those of ordinary skill in the art that the network connections shown are exemplary and other means of establishing a communications link between the computers (e.g., server 306 and computers 302) may be used.

The exemplary computing system environment 300 includes a general-purpose computing device in the form of a server 306. Components of the server 306 may include, without limitation, a processing unit, internal system memory, and a suitable system bus for coupling various system components, including a database 308, with the server 306. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as a Mezzanine bus.

The server 306 typically includes therein, or has access to, a variety of computer-readable media, for instance, database 308. Computer-readable media can be any available media that may be accessed by the server 306, and includes volatile and nonvolatile media, as well as removable and non-removable media. By way of example, and not limitation, computer-readable media may include computer storage media. Computer storage media may include, without limitation, volatile and nonvolatile media, as well as removable and non-removable media implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information, and which may be accessed by server 306. By way of example, and not limitation, communication media includes wired media such as a wired network or direct-wired connection, and wireless media such as acoustic, RF, infrared, and other wireless media. Combinations of any of the above also may be included within the scope of computer-readable media.

The computer storage media discussed above and illustrated in FIG. 3, including the database 308, provide storage of computer-readable instructions, data structures, program modules, and other data for computers 302 and server 306.

Figure 4:
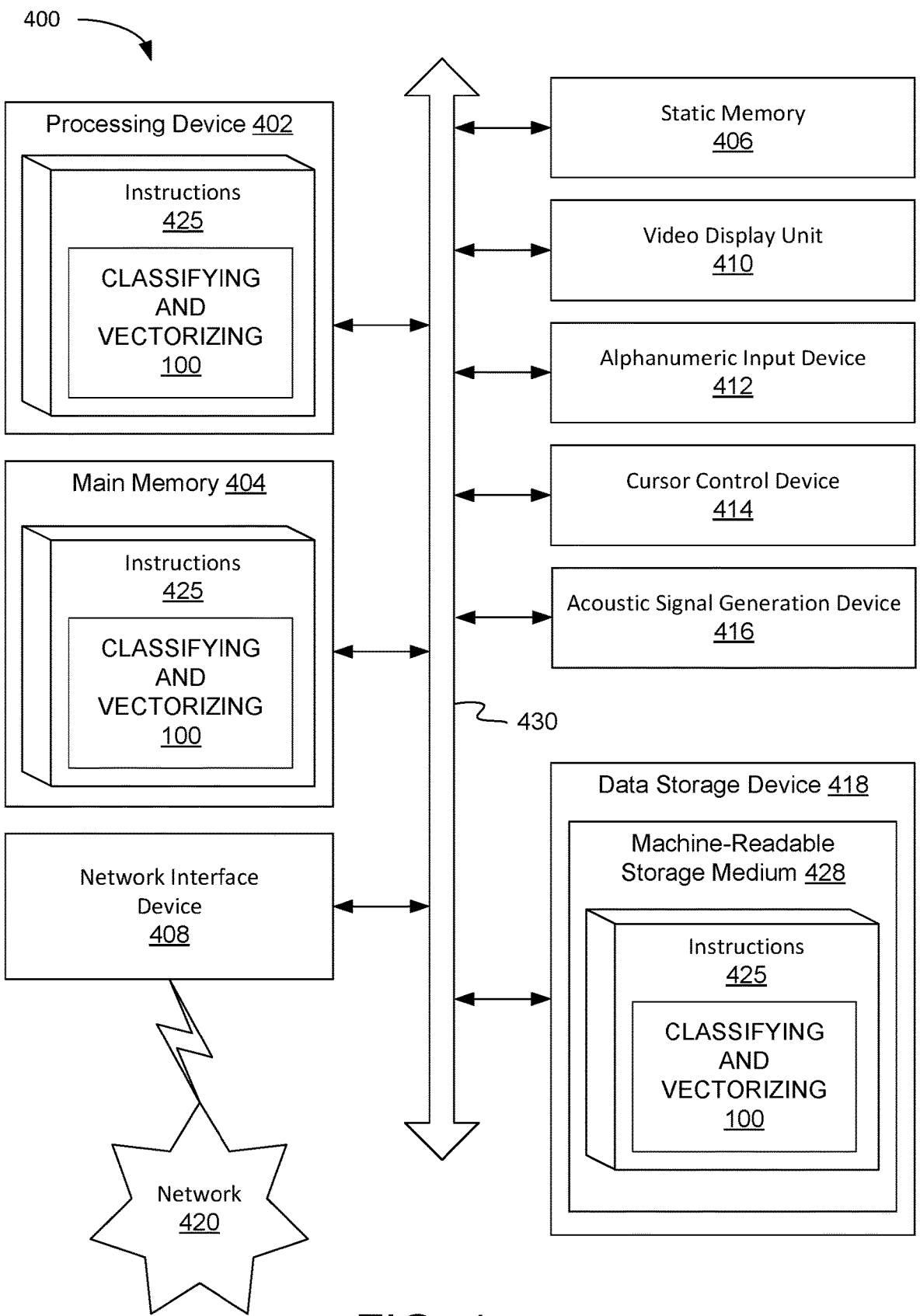
FIG. 4 is a block diagram of an example apparatus that may perform one or more of the operations described herein, in accordance with some embodiments of the present disclosure.

FIG. 4 is a block diagram of an example apparatus 400 that may perform one or more of the operations described herein, in accordance with some embodiments. Apparatus 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example apparatus 400 may include a processing device 402, e.g., a general-purpose processor, programmable logic device (PLD), etc., a main memory 404, e.g., synchronous dynamic random-access memory (DRAM), read-only memory (ROM), static memory 406, e.g., flash memory, and a data storage device 418, which may communicate with each other via a bus 430.

Processing device 402 may be provided by one or more general-purpose processing devices such as a microprocessor, central processing unit, or the like. In an illustrative example, processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also include one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Apparatus 400 may further include a network interface device 408 that may communicate with a network 420. The computing device 400 also may include a video display unit 410, e.g., a liquid crystal display (LCD) or a cathode ray tube (CRT), an alphanumeric input device 412, e.g., a keyboard, a cursor control device 414, e.g., a mouse, and an acoustic signal generation device 416, e.g., a speaker. In one embodiment, video display unit 410, alphanumeric input device 412, and cursor control device 414 may be combined into a single component or device, e.g., an LCD touch screen.

Data storage device 418 may include a computer-readable storage medium 428 on which may be stored one or more sets of instructions 425 that may include instructions for classifying an image, determining and applying an algorithm to vectorize the image, and making the vector image editable 100, as described herein, in accordance with one or more aspects of the present disclosure. The instructions 425 may include instructions for performing the functions of process 100 as shown in FIG. 1 above. Instructions 425 may also reside, completely or at least partially, within main memory 404 and/or within processing device 402 during execution thereof by apparatus 400, main memory 404 and processing device 402 also constituting computer-readable media. The instructions 425 may further be transmitted or received over a network 420 via network interface device 408.

While computer-readable storage medium 428 is shown in an illustrative example to be a single medium, the term "computer-readable storage medium" should be taken to include a single medium or multiple media, e.g., a centralized or distributed database and/or associated caches and servers, that store the one or more sets of instructions. The term "computer-readable storage medium" shall also be taken to include any medium capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended to not invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in a manner that can perform the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein but may be modified within the scope and equivalents of the appended claims.

What is claimed is:

1. A method, comprising:
   importing an image;
   classifying the image;
   selecting a first algorithm from a plurality of algorithms, based on an image classification;
   providing a visual indication, on a graphical user interface (GUI), of the first algorithm;
   receiving an input from a user, via the GUI, indicating that the user selects a second algorithm for vectorizing the image, wherein, upon classifying the image as a photograph, the second algorithm comprises:
      performing statistical region merging to group neighboring pixels in the image based on a similarity of their color shades within a threshold;
      splitting a set of colors of the image into a set of buckets and merging the set of buckets into regions; and
      identifying boundaries of the regions and establishing outline paths;
   vectorizing the image using the second algorithm; and
   providing an editable version of the vectorized image.

2. The method of claim 1, wherein the first algorithm and the second algorithm are the same.

3. The method of claim 2, wherein the image is a red-green-blue (RGB) image resized to 224×224 pixels.

4. The method of claim 1, wherein the image is a bitmap image.

5. The method of claim 1, wherein:
   the image is evaluated as each of a plurality of image types; and
   as a result of a determination of a probability of the image being each of the image types, wherein the sum of the probabilities of the image types is 1.0, the image is classified as the image type with the highest probability.

6. The method of claim 1, wherein the image is classified using a convolutional neural network.

7. The method of claim 6, wherein the convolutional neural network is trained using a dataset based on a focal loss function.

8. The method of claim 1, wherein the image is classified using a dataset comprising user-contributed art.

9. The method of claim 1, further comprising:
   providing a visual indication, on the GUI, of a second algorithm;
   receiving an input from the user, via the GUI, indicating that the user selects the second algorithm for vectorizing the image, overriding the first algorithm;
   vectorizing the image using the second algorithm; and
   providing an editable version of the vectorized image.

10. The method of claim 1, wherein the curve segments are Bezier curve segments.

11. A system, comprising:
a memory; and;
a processing device, operatively coupled to the memory, to:
import an image;
classify the image;
select a first algorithm from a plurality of algorithms, based on an image classification;
provide a visual indication, on a graphical user interface (GUI), of the first algorithm;
receive an input from a user, via the GUI, indicating that the user selects a second algorithm for vectorizing the image, wherein, upon classifying the image as a photograph, the second algorithm comprises:
performing statistical region merging to group neighboring pixels in the image based on a similarity of their color shades within a threshold;
splitting a set of colors of the image into a set of buckets and merging the set of buckets into regions; and
identifying boundaries of the regions and establishing outline paths;
vectorize the image using the second algorithm; and
provide an editable version of the vectorized image.

12. The system of claim 11, wherein the system classifies the image as one of a photograph, a sketch, and an illustration.

13. The system of claim 11, wherein:
the image is evaluated as each of a plurality of image types; and
as a result of a determination of a probability of the image being each of the image types, wherein the sum of the probabilities of the image types is 1.0, the image is classified as the image type with the highest probability.

14. The system of claim 11, wherein the system classifies the image using a convolutional neural network.

15. The system of claim 14, wherein the convolutional neural network is trained using a dataset comprising user-contributed art.

16. A non-transitory computer-readable storage medium including instructions that, upon execution by a processing device, cause the processing device to:
import an image;
classify the image;
select a first algorithm from a plurality of algorithms, based on an image classification;
provide a visual indication, on a graphical user interface (GUI), of the first algorithm;
receive an input from a user, via the GUI, indicating that the user selects a second algorithm for vectorizing the image, wherein, upon classifying the image as an illustration, the second algorithm comprises:
obtaining a probability skeleton map from the regions;
thresholding the probabilities of the probability skeleton map to obtain binary markers;
eliminating small binary markers based on a minimize size element threshold;
segmenting the regions using a watershed algorithm; and
merging regions with similar colors;
vectorize the image using the second algorithm; and
provide an editable version of the vectorized image.

17. The non-transitory computer-readable storage medium of claim 16, wherein the instructions classify the image as one of a photograph, a sketch, and an illustration.

18. The non-transitory computer-readable storage medium of claim 16, wherein the editable version of the vectorized image is reprocessed using a third algorithm.

* * * * *